United States Patent [19]

de Villiers et al.

[11] Patent Number: 5,002,671

[45] Date of Patent: Mar. 26, 1991

[54] HYDRO-CYCLONE WITH CIRCULATION OUTLET FOR BOUNDARY LAYER FLOW

[75] Inventors: Pierre de Villiers; Gideon J. du Toit, both of Hartbeespoort, South Africa

[73] Assignee: Cyclofil (Proprietary) Limited, Pretoria, South Africa

[21] Appl. No.: 363,067

[22] Filed: Jun. 8, 1989

[30] Foreign Application Priority Data

Jun. 9, 1988 [ZA] South Africa ........................ 88/4131

[51] Int. Cl.[5] ............................................ B01D 17/038

[52] U.S. Cl. .................................. 210/740; 55/459.1; 209/144; 209/211; 210/97; 210/194; 210/512.1; 210/788; 210/805

[58] Field of Search ..................... 210/512.1, 787, 805, 210/788, 789, 97, 739, 740, 194; 209/211, 1, 144; 162/29, 264; 55/52, 459.1

[56] References Cited

U.S. PATENT DOCUMENTS

| | | | |
|---|---|---|---|
| 2,379,411 | 7/1945 | Berges | 210/788 |
| 2,781,910 | 2/1957 | Fontein | 210/805 |
| 3,696,934 | 10/1972 | Oisi | 209/211 |
| 3,833,468 | 9/1974 | Boniface | 162/264 |

FOREIGN PATENT DOCUMENTS

| | | | |
|---|---|---|---|
| 539361 | 12/1955 | Belgium | 209/211 |
| 53-112582 | 10/1978 | Japan | 210/512.1 |
| 226068 | 4/1969 | Sweden | 210/512.1 |
| 316747 | 11/1969 | Sweden | 210/512.1 |
| 848054 | 7/1981 | U.S.S.R. | 210/512.1 |
| 1053159 | 12/1966 | United Kingdom | 209/211 |
| 1355916 | 12/1974 | United Kingdom | 210/512.1 |
| 2136326 | 9/1984 | United Kingdom | 55/459.1 |
| 2152401 | 8/1985 | United Kingdom | 210/512.1 |
| 2205512 | 12/1988 | United Kingdom | 210/512.1 |

*Primary Examiner*—Robert A. Dawson
*Assistant Examiner*—Joseph Drodge

[57] ABSTRACT

A hydro-cyclone includes a hollow round casing having, co-axially in series, a cylindrical portion and a frusto-conical portion tapering toward one end of the cyclone. An end plate closes off the cylindrical portion opposed to the taper end. A tangential inlet conducts a fluid flow stream to be classified tangentially into the cylindrical portion. A co-axial, heavy fraction outlet is provided at the taper end. A co-axial, light fraction outlet is provided through the end plate, preferably via a porthole in the cylindrical portion axially spaced from the end plate. The invention provides for drawing-off of fluid flowing from the inlet inwardly in a boundary layer adjacent the end plate via a circulation outlet in the end plate, preferably annularly around the light fraction outlet.

11 Claims, 2 Drawing Sheets

HYDRO-CYCLONE WITH CIRCULATION OUTLET FOR BOUNDARY LAYER FLOW

BACKGROUND OF THE INVENTION

1. Field of the Invention

This invention relates to a method of operating a hydro-cyclone and to a hydro-cyclone.

2. Summary of the Invention

In accordance with the invention, there is provided a method of operating a hydro-cyclone comprising

- a hollow, round casing having, co-axially in series, a cylindrical portion and a frusto-conical portion, the frusto-conical portion tapering toward one end of the hydro-cyclone;
- an end plate closing an axially outer end of the cylindrical portion opposed to said one end;
- a tangential inlet into the cylindrical portion;
- a co-axial, light fraction outlet through said end plate; and
- a co-axial, heavy fraction outlet at said one, taper end of the frusto-conical portion, the method including the step of drawing-off fluid flowing from the inlet inwardly adjacent the end plate.

Such drawing-off may preferably take place annularly outwardly of the light fraction outlet. Preferably, the light fraction outlet will be provided at a position axially spaced from the end plate.

The method may include circulating the drawn-off fluid by conducting it to a feed stream upstream of the inlet. Instead, the method may include conducting the drawn-off fluid to an underflow downstream of the heavy fraction outlet.

The invention extends to a hydro-cyclone comprising

- a hollow, round casing having, co-axially in series, a cylindrical portion and a frusto-conical portion, the frusto-conical portion tapering toward one end of the hydro-cyclone;
- an end plate closing an outer end of the cylindrical portion opposed to said one end;
- a tangential inlet into the cylindrical portion;
- a co-axial, light fraction outlet through said end plate;
- a co-axial, heavy fraction outlet at said one, taper end of the frusto-conical portion; and
- a circulation outlet in the end plate arranged to draw-off fluid flowing in use from the inlet inwardly adjacent the end plate.

Preferably, the circulation outlet is arranged annularly outwardly of the light fraction outlet. The circulation outlet may be substantially at the level of or in the plane of the end plate, the light fraction outlet being provided by a porthole in the cylindrical portion axially spaced from the end plate.

The circulation outlet may be in communication with a plenum downstream thereof. The plenum may be connected to a feed passage upstream of the tangential inlet. Instead, the plenum may be connected to an underflow passage downstream of the heavy fraction outlet.

BRIEF DESCRIPTION OF THE DRAWINGS

The invention is now described by way of example wit reference to the accompanying diagrammatic drawings. In the drawings.

DETAILED DESCRIPTION OF THE PREFERRED EMBODIMENTS

Figure 1:
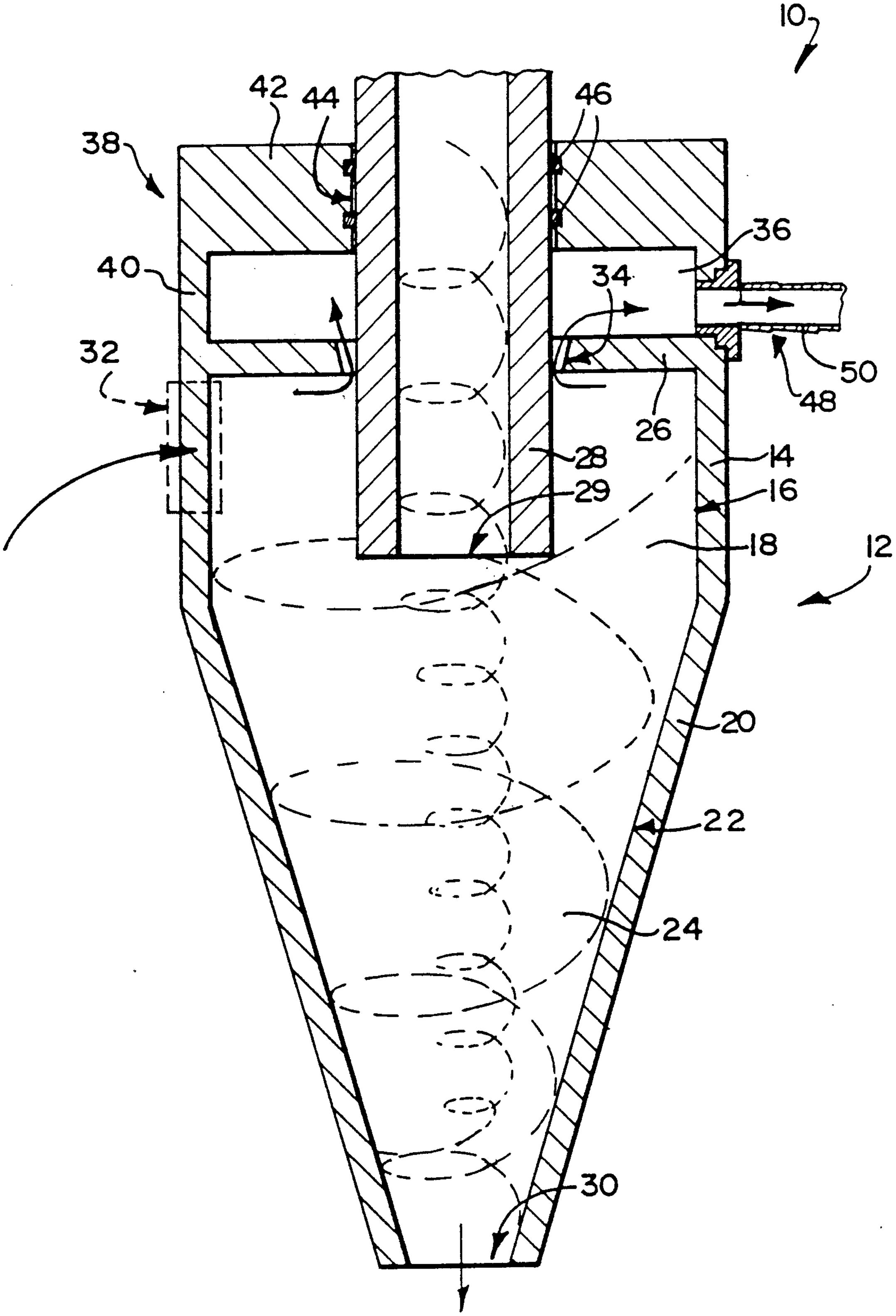
FIG. 1 shows, in axial section, a hydro-cyclone in accordance with the invention.

With reference to FIG. 1 of the drawings, a hydro-cyclone in accordance with the invention is generally indicated by reference numeral 10. It comprises a casing generally indicated by reference numeral 12.

The casing 12 is of hollow, round construction and includes, extending from a position near one end of the hydro-cyclone to an intermediate position, a cylindrical wall 14 having a corresponding cylindrical inner periphery 16 defining a cylindrical volume 18. The casing 12 has a frusto-conical wall 20 extending coaxially from the inner end of the cylindrical wall 14 toward the opposed end of the hydro-cyclone 10. The frusto-conical wall 20 has a corresponding frusto-conical inner periphery 22 defining a corresponding frusto-conical volume 24.

Toward the first mentioned end of the hydro-cyclone 10, there is provided a transverse end plate 26 or disc to close the outer end of the cylindrical volume 18. A co-axially arranged tube 28 extends through the end plate 26 and penetrates into the cylindrical volume 18 to form a co-axial light fraction outlet port 29 remote from the end plate 26 and from which an overflow will emit in use.

At the opposed end, the frusto-conical wall 20 terminates to form a co-axial heavy fraction outlet 30 from which an underflow will emit in use.

In the cylindrical volume 18, there is provided an inlet 32 orientated tangentially with respect to the cylindrical volume 18, via which a feed stream will enter in use.

In the end plate 26, annularly outwardly of the periphery of the tube 28, there is provided a coaxial, annular circulation outlet 34 leading into a plenum 36. The outlet 34 is shown to be frusto-conical in FIG. 1. Instead, as preferred in many applications, it may be parallel. The plenum 36 is defined by an extension 38 of the casing 12. The extension 38 is conveniently integral with the rest of the casing 12. The extension 38 comprises a cylindrical wall 40 co-extensive with the cylindrical wall 14 and an inwardly extending boss 42 having a central aperture 44 in which the tube 28 is sealingly received by means of "O"-rings 46.

A circumferential outlet 48 is provided from the plenum 36 via a nipple 50 mounted in an outlet aperture in the cylindrical wall 40. A conduit will in use be provided over the nipple 50 to conduct fluid from the plenum 36. The conduit may, for example, conduct such fluid to the feed stream upstream of the inlet 32, or, if desired and if process circumstances permit, to the underflow downstream of the heavy fraction outlet 30.

The inventors do not wish to be bound by theory. However, the inventors believe that a theoretical explanation of flow in the region downstream of the inlet 32 will enhance an understanding of the instant invention.

It is to be appreciated that flow downstream of the inlet 32 in the cylindrical volume 18 is rotating flow. In a rotating flow field a pressure gradient exists which increases with radius i.e. the static pressure in the flow field at a large radius is larger than at a small radius. Thus, purely on account of such pressure gradient, flow will tend to move radially inwardly.

On account of the rotating nature of the flow, centrifugal forces act on flow elements tending to urge such flow elements outwardly.

On flow elements or particles of a high density, the centrifugal forces (which are a function of the mass of the flow elements or particles) tend to dominate because of the high mass : volume ratio of the dense flow element or particle and tend to move such flow element or particle outwardly.

Conversely, on flow elements or particles of low density, which have a low mass : volume ratio, the pressure forces tend to dominate and tend to move such light flow elements or particles inwardly.

The hydro-cyclone operates in accordance with the above principles. Flow containing flow elements or particles of both high and low density enter the cylindrical volume 18 tangentially via the inlet 32 thus establishing a rotating flow field in the cylindrical portion 18. The general flow pattern is away from the inlet on account of continued inflow through the inlet. Dense particles and flow elements concentrate toward the outer peripheral portion and move downwardly along the taper periphery 22 toward the heavy fraction outlet 30. Particles and flow elements of lower density tend to concentrate toward the axis of the cyclone.

The "cut" of the cyclone (i.e. the proportions of flow respectively through the light fraction outlet and through the inlet) may be controlled by suitable geometric design or by controlling the respective flows by means of valves, or by a combination thereof. Generally by far the larger proportion of flow takes place through the light fraction outlet, i.e. the overflow. Thus, flow elements and particles, especially toward the centre of the cyclone and toward the tapered end of the tapered volume 24, experience a pressure gradient urging them to flow toward the light fraction outlet. They thus undergo a flow reversal in respect of their flow component in the axial direction.

It is, however, to be appreciated that when a flow element or a particle in a rotating flow field impinges on an obstruction or when it is decelerated, such as in the boundary layer adjacent the end plate 26, the rotational component of the flow is destroyed or retarded, thus obviating or lowering the centrifugal forces while the pressure gradient is upheld. Thus, because of the pressure gradient, and regardless of density, flow elements and particles tend to move inwardly toward the axis of the cyclone.

Assume for a moment that the annular circulation outlet 34 is blocked or does not exist. Then, the inward flow in or adjacent the boundary layer of the end plate 26 will move to an annular position near the tube 28 and thence downwardly toward the light fraction outlet 29. In this fashion, undesirably, also flow elements or particles of high density exit via the light fraction outlet 29. This tendency detrimentally affects the operation of the cyclone 10. The detrimental affect described above is worse when the tube 28 extends only a small distance, or not at all, into the cylindrical volume 18. The detrimental affect is somewhat ameliorated, but only to a limited extent, if the tube 28 extends well into the cylindrical volume 18.

However, in accordance with the invention, and bearing in mind the existence of the annular circulation outlet 34, the undesirable flow described above exits via the annular circulation outlet 34 into the plenum 36 from where it is circulated either to a position upstream of the inlet 32 where it is introduced into the feedstream, or is introduced into the underflow downstream of the heavy fraction outlet 30 if circumstances are suitable, or is conducted to any other desirable reservoir or the like.

The Inventors have found in tests that the undesirable flow in or adjacent to the boundary layer of the end plate 26 is proportional to the cyclone diameter ($D_c$), the viscosity ($\mu$) of the flow medium (slurry or particle containing gas stream) and the spin Reynolds number ($Re_\theta$ which is defined in terms of the cyclone radius $D_c/2$ and average inlet velocity) raised to a power of about 0.8, i.e.

$$\text{mass flow} = c \cdot \mu \cdot D_c \cdot (Re_\theta)^{0.8} = c \cdot \mu \cdot D_c \cdot \left\{ \frac{\rho \cdot D_{c/2} \cdot V\text{inlet}}{\mu} \right\}^{0.8}$$

The value of the "constant" c varies between narrow limits with pressure ratio and is dependant from the general geometry of the cyclone. The value of c for a cyclone of specified geometric can be established experimentally.

Thus, a desired mass flow through the annular circulation outlet 34 can be pre-calculated. In practice, the mass flow through the circulation outlet can be controlled, e.g. by means of a valve downstream of the plenum 36.

The annular circulation outlet 34 should be of sufficient flow area to permit the specific boundary layer volume flow for the particular application to be extracted without preferential extraction of particles of a particular size. Desirably, the flow speed through the outlet 34 should be of the same order as flow speeds through the heavy fraction outlet 30 and the light fraction outlet 29.

Figure 2:
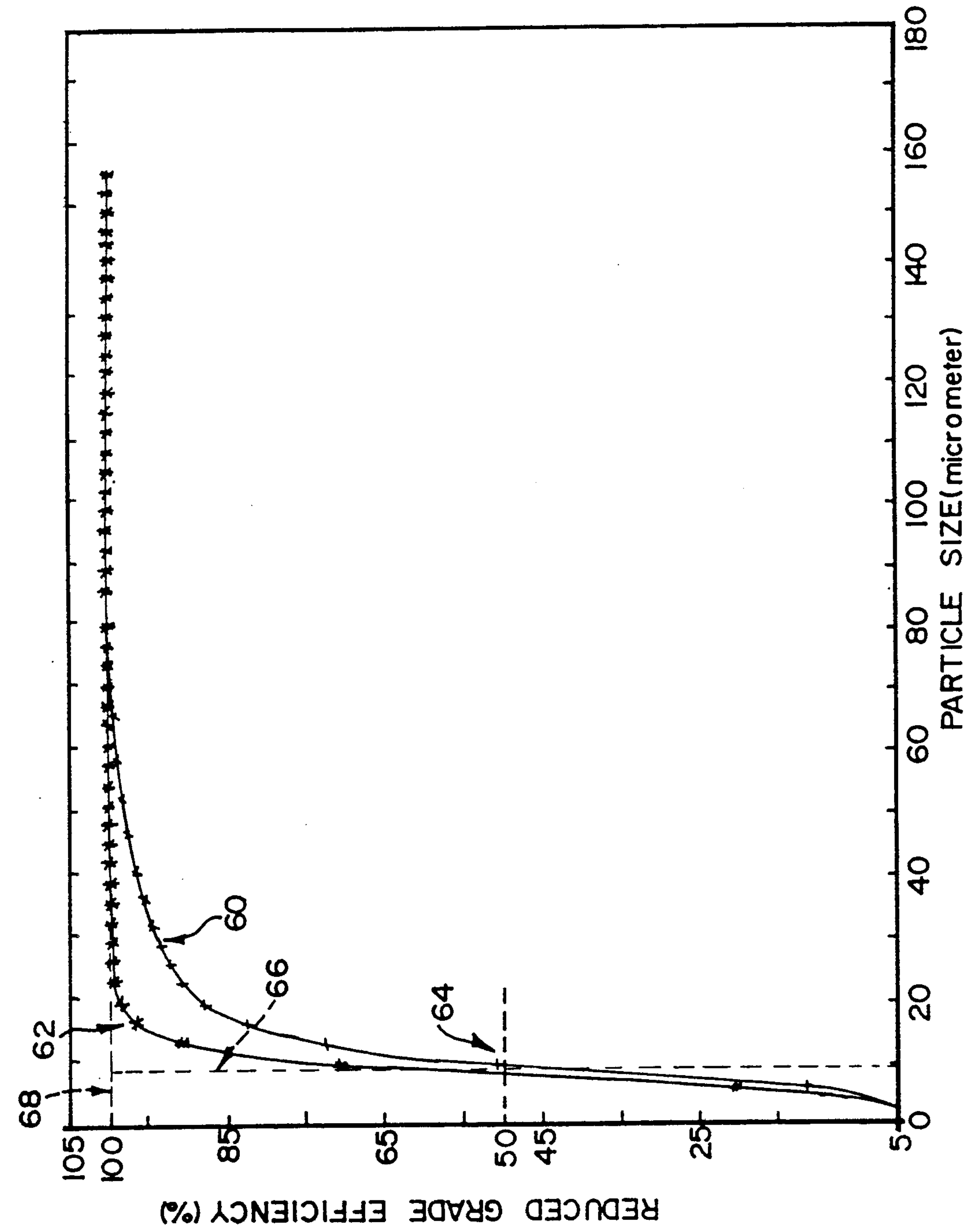
FIG. 2 shows a graph comparing reduced grade efficiency or Tromp curves for a cyclone in accordance with the invention and a conventional cyclone.

With reference to FIG. 2 of the drawings, Reduced Grade Efficiency or Tromp curves are shown which were obtained respectively for a hydrocyclone in accordance with the invention and for the same hydrocyclone, but operated conventionally, i.e. without circulation via the outlet 34.

Plot 60 shows the performance of the cyclone operated conventionally. Plot 62 shows the performance of the cyclone operated in accordance with the invention. The Plots 60 and 62 are to be compared to a theoretically ideal curve described below.

Assume that the cyclone is to have a cut at a particle size of 8 micrometer. This theoretical cut is shown in dotted at 66. The 100% efficiency line is shown at 68. Ideally, all particles to the right of the cut line 66, i.e. particles larger than 8 micrometer, are separated from all particles to the left of the cut line 66, i.e. particles smaller than 8 micrometer.

For the sake of comparison, assume that the cut line 66 intersects both the plots 60 and 62 at the 50% reduced efficiency point at 64.

The area above the cut point 64 and between the plot 60 and the ideal curve 66, 68 is indicative of the degree of contamination of the light flowstream by particles larger than 8 micrometer, for the cyclone operated conventionally.

Similarly the corresponding area above the plot 62 is indicative of the degree of contamination in respect of the cyclone when operated in accordance with the invention.

It is clear that the contamination in the case of the plot 62 is a marked improvement on that of the plot 60.

By way of example the Inventors have found that in a standard 2" Mosley hydrocyclone of 44 mm diameter operating at a pressure drop of about 200 kPa with a 10% (by volume) slurry of fluorspar of 45 micrometer median particle size, a circulation flow of 25% of the inlet flow results in a decrease in the contamination of the overflow stream by particles greater than the cut-size to between about 25% and about 50% of the contamination of a comparable conventional non-circulating cyclone. Differently stated the area above the reduced grade efficiency or Tromp curve can likewise be reduced to an area between about 25% and about 50% of that of a comparable conventional cyclone by the circulation of 25% of the feedflow.

In the example mentioned, the Inlet 32 was 9,5 mm×6,5 mm, the outlet diameter 30 was 9,5 mm and the outlet diameter 29 was 10 mm.

The Applicant is of opinion that it is an advantage of the invention that misplacement of denser particles or flow elements is ameliorated and that the grade efficiency curve of the cyclone is sharpened or improved. Generally, the cyclone is able to classify the flow more accurately.

We claim:

1. A method of operating a hydro-cyclone comprising:

- a hollow, round casing having, co-axially in series, a cylindrical portion and a frusto-conical portion, the frusto-conical portion tapering toward one end of the hydro-cyclone;
- an end plate closing an axially outer end of the cylindrical portion opposed to said one end;
- a tangential inlet into the cylindrical portion adjacent said end plate;
- a co-axial, light fraction outlet through said end plate; and
- a co-axial, heavy fraction outlet at said one, taper end of the frusto-conical portion, the method including:

- injecting flow, containing flow elements of relatively low density and flow elements of relatively high density, tangentially into the cylindrical portion via the tangential inlet;
- allowing rotating flow to be established on account of said tangential injection of the flow, the rotating flow generating:
- a pressure gradient increasing with radius and acting on flow elements to tend to move the flow elements radially inwardly, without regard to the relative densities of the flow elements;
- centrifugal forces acting on flow elements in direct relation to their relative densities to tend to move the elements radially outwardly;
- allowing the flow elements of higher density to concentrate radially outwardly on account of the effect of the centrifugal forces dominating, and allowing the flow elements of lower density to concentrate radially inwardly on account of the effect of the pressure gradient dominating;
- generally moving the flow toward the taper end;
- exhausting a radially outer fraction of the flow in which the flow elements of higher density are concentrated, via the heavy fraction outlet;
- moving a remaining, radially inner, fraction of the flow, in which the flow elements of lower density are concentrated, toward the light fraction outlet and exhausting the fraction of the flow via said light fraction outlet;
- treating boundary layer flow, in the form of flow in a boundary layer against the end plate and containing flow elements of higher density and of lower density in undifferentiated condition as emanated from the tangential inlet, in which boundary layer flow of the rotational component is at most effective in attenuated form and the pressure gradient is substantially fully effective, resulting in said boundary layer flow containing the flow elements of higher density and of lower density in undifferentiated condition and flowing inwardly under the influence of said pressure gradient, to prevent said boundary layer flow from being exhausted via the light fraction outlet and thus from contaminating the light fraction overflow with said flow elements of higher density, by selectively drawing off the boundary layer flow via a circulation outlet provided for that purpose through the end plate in the plane of the end plate at an annular position outward of the light fraction outlet.

2. The method according to claim 1, and further including circulating the drawn-off boundary layer flow by conducting the boundary layer flow to a feed stream upstream of the inlet.

3. The method according to claim 1, and further including conducting the drawn-off boundary layer flow to an underflow downstream of the heavy fraction outlet.

4. The method according to claim 1, wherein the flow being drawn off via the circulation outlet flows through the circulation outlet at an average flow speed substantially equal to the average speeds of the flows through the light fraction outlet and the heavy fraction outlet.

5. The method according to claim 1, and further including controlling the flow through the circulation outlet in accordance with the formula $$\text{mass flow} = c.\ \mu.\ D_c.\ (Re_\theta)^{0.8}$$

in which

- c is a constant for a cyclone of specific geometry and is dependent from said geometry,
- $\mu$ is the viscosity of the flow medium,
- $D_c$ is the cyclone diameter, and
- $Re_\theta$ is the spin Reynolds Number and is $$= \frac{\rho D_{c/2} \cdot V\text{inlet}}{\mu}$$

in which Vinlet is the average inlet velocity.

6. A hydro-cyclone comprising:

- a hollow, round casing having, co-axially in series, a cylindrical portion and a frusto-conical portion, the frusto-conical portion tapering toward one end of the hydro-cyclone;
- an end plate closing an outer end of the cylindrical portion opposed to said one end;
- a co-axial, light fraction outlet through said end plate;
- a tangential inlet into the cylindrical portion adjacent said end plate;
- a co-axial, heavy fraction outlet at said one, taper end of the frusto-conical portion; and
- a circulation outlet through the end plate and in the plane of the end plate at a position annularly outward of the light fraction outlet, said circulation outlet being constructed and arranged to selectively draw-off a flow volume flowing in a boundary layer from the inlet inwardly adjacent the end plate.

7. The hydro-cyclone according to claim 6, wherein the light fraction outlet is provided in the cylindrical portion axially spaced from the end plate by a porthole at an end of a duct extending through the end plate axially into the cylindrical portion.

8. The hydro-cyclone according to claim 6, wherein the circulation outlet is in communication with a plenum downstream thereof.

9. The hydro-cyclone according to claim 8, wherein the plenum is connected to a feed passage upstream of the tangential inlet.

10. The hydro-cyclone according to claim 8, wherein the plenum is connected to an underflow passage downstream of the heavy fraction outlet.

11. The hydro-cyclone according to claim 6, and further including control means for controlling the mass flow through the circulation outlet in accordance with the formula $$\text{mass flow} = c.\ \mu.\ D_c.\ (Re_\theta)^{0.8}$$

in which c is a constant for a cyclone of specific geometry and is dependent from said geometry, $\mu$ is the viscosity of the flow medium, $D_c$ is the cyclone diameter, and $Re_\theta$ is the spin Reynolds Number and is $$= \frac{\rho D_{c/2} \cdot V\text{inlet}}{\mu}$$

in which Vinlet is the average inlet velocity.

* * * * *